J. JACK.
Buggy Running-Gear.
No. 110,141.   Patented Dec. 13, 1870.
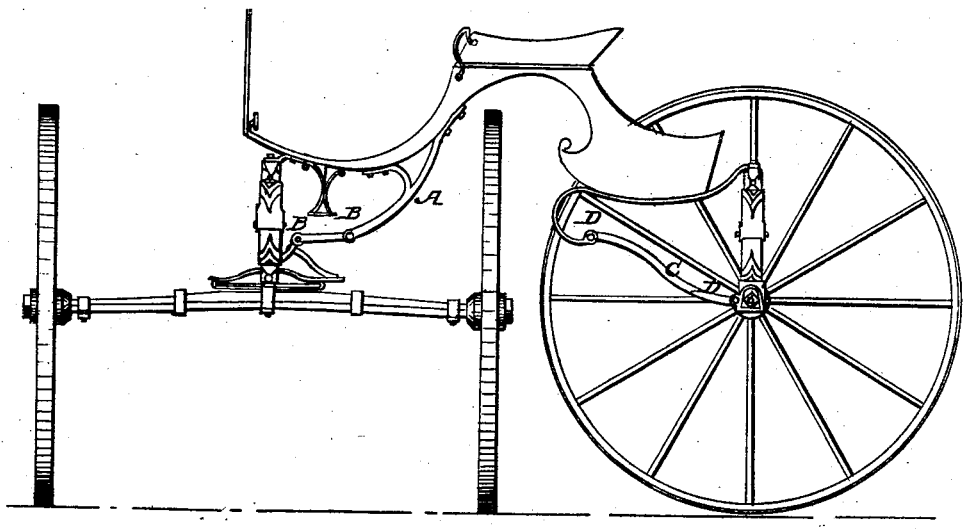

United States Patent Office.

JOHN JACK, OF TISKILWA, ILLINOIS.

Letters Patent No. 110,141, dated December 13, 1870.

IMPROVEMENT IN VEHICLES.

The Schedule referred to in these Letters Patent and making part of the same.

*To all whom it may concern:*

Be it known that I, JOHN JACK, of Tiskilwa, Bureau county, in the State of Illinois, have invented a mode and appliances so as to dispense with the Reach or Coupling-Pole in Buggies and Carriages, enabling the vehicle to be turned around on nearly the ground upon which it stands when at rest; and I do hereby declare that the following is a full and exact description thereof, reference being had to the accompanying drawing and to the letters of reference marked thereon.

The nature of my invention consists of certain appliances for so attaching the body of a carriage to the axles as to dispense with the reach or coupling-pole, and thus enabling the carriage to turn around on a small space of ground.

To enable others skilled in the art to make and use my invention, I will proceed to describe its construction and operation.

I construct my carriages in any of the known forms or patterns, so far as the wheels, axles, and body or box and upper parts are concerned, except a certain curve or concave beneath the box, permitting the forward wheels in turning to go beneath the box to any required extent.

I place strong bands or strips of iron, running from front to rear on each side, within, and thus concealed from view, so as to give the necessary strength to the body for certain attachments to be made, which I will hereafter describe, which I call "drawing-braces," to be placed one on each side, in front and in rear.

The construction of the forward drawing-braces consists of one on each side, reaching from beneath the box, near the middle, running in a curve to the head-block, where the lower end is securely fastened. One of these is shown in the accompanying drawing, marked A.

Each of these drawing-braces has two joints or hinges, so as to enable the springs of the carriage to work naturally. These are marked B in the drawing.

The two rear drawing-braces consists, also, of one on each side somewhat similar to the forward ones, attaching them beneath the box by a hinge-joint, and also to the rear axle by a joint, so as to permit the rear springs to work naturally.

The rear brace in drawing is marked C, and the hinge-joints D.

What I claim as my invention, and desire to secure by Letters Patent, is—

The within-described buggy or carriage, composed of the elliptical springs placed parallel with the axles, the box with concave on its under side, the brace A, hinged joints B B, and the curved bar extending from the rear spring under the box, and connected by the joint D to the rear brace C, all constructed substantially as set forth.

JOHN JACK.

Witnesses:
L. D. WHITING,
JOHN R. MILLS, Jr.